May 10, 1927.
A. V. KNECHTEL
1,627,976
METHOD OF PRODUCING COMPOSITE MOVING PICTURE FILMS
Filed Aug. 25, 1924
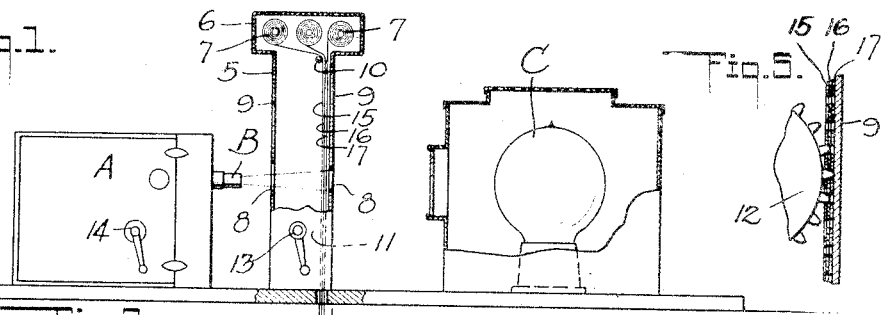
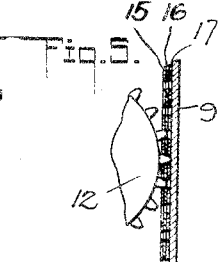
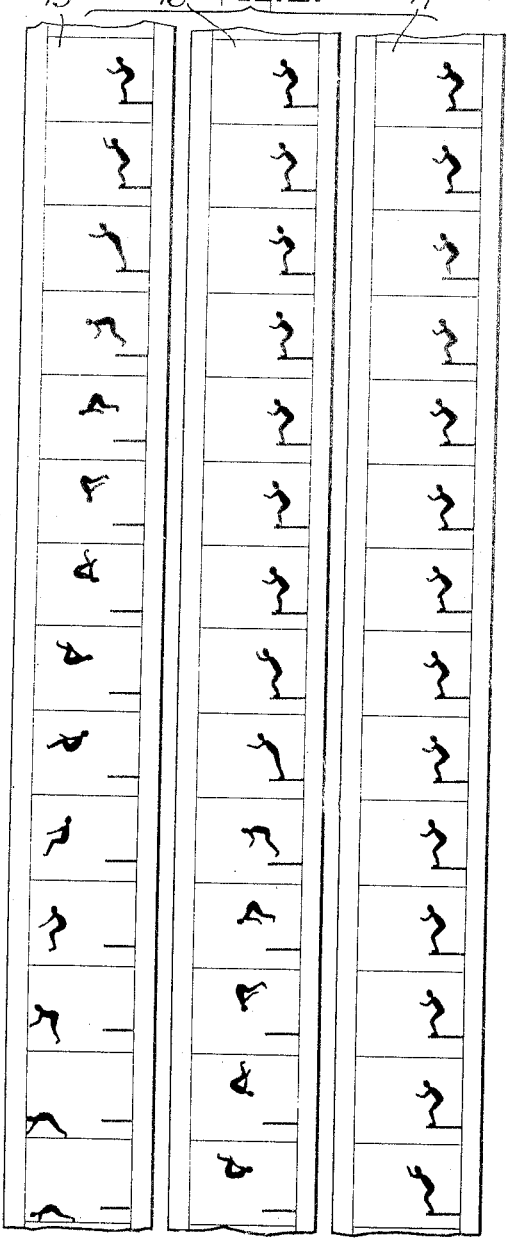
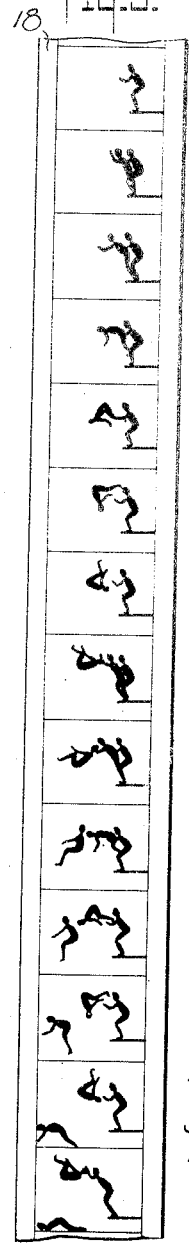
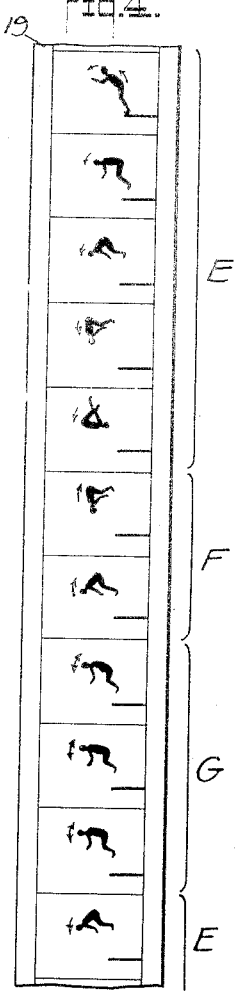
Inventor
ALVIN V. KNECHTEL
Munn & Co.
Attorneys Patented May 10, 1927.

1,627,976

UNITED STATES PATENT OFFICE.

ALVIN V. KNECHTEL, OF LOS ANGELES, CALIFORNIA, ASSIGNOR TO PATHE EXCHANGE, INC., A CORPORATION OF NEW YORK.

METHOD OF PRODUCING COMPOSITE MOVING-PICTURE FILMS.

Application filed August 25, 1924. Serial No. 734,013.

This invention relates to the class of photography, and particularly to an apparatus for and method of producing what I shall call freak pictures of objects in motion so that many amusing, interesting and constantly changing effects will be had and visualized when the pictures are projected upon an exhibiting screen or surface.

Generally speaking, my invention consists in providing a plurality of identical positive film strips of the kind employed in the motion picture art; superimposing the films in a manner that will bring about a relatively longitudinally stepped arrangement of the frames of one strip with respect to the frames of adjacent film strips and to register mating frames of the respective films and cause the images of the same objects in motion in said mating frames to jects in motion in said mating frames to appear in changed or successive positions when viewed through the registered frames; moving the positive films across a light source while superimposed and in the direct presence of a sensitized film as the latter is drawn through a motion picture camera; thereby producing in the frames of the sensitized film photographic impressions in multiple of the images borne by the aforesaid superimposed frames of the positive films, all in such manner that an image of the same object in motion of the respective positive films will be photographed in multiple and in timed-successively-changed-order in each of the frames of said sensitized film, and finally developing the sensitized film to convert it into a master or negative, which positives may be printed in the usual manner. In this manner, each commercial positive taken from a plurality of superimposed master positives will have its frames provided with a multiplicity of the same image in relatively successive positions. I am able to thereby obtain an unlimited number of pleasing effects by simply photographing a single image upon a negative from which as many positives may be printed as desired to satisfy a particular requirement. While my invention is exceedingly useful in connection with what are called comedies, the practicability of the invention will be appreciated, and it will be seen that it can be put to many legitimate uses in the art of motion picture photography wherein it may be desired to utilize a minimum number of photographed subjects or objects in producing mob, crowd sets or the like.

With the above and other objects in view, the invention will be more readily understood with reference to the accompanying drawing, in which Figure 1 is a view in side elevation of the instrumentalities necessary in carrying the invention into practice, parts being shown in section;

Figure 2 is a plan view of a plurality of positive films showing the manner of longitudinally stepping the frames before establishing a superimposed order of the films;

Figure 3 is a plan view of a positive printed from a negative prepared from the positives shown in Figure 2 after superimposing the latter;

Figure 4 is a plan view of a modified form of my invention; and

Figure 5 is a diagrammatic view of the film drawing sprocket employed to move the positives (Figure 2) synchronously.

A is a camera of the customary well known type used in taking pictures of objects in motion, and B is the lens or exposure opening thereof. In line with said lens is a lamp house or suitable source of light C for causing imprints to be placed upon a sensitized film as the latter functions in said camera.

Interposed between the light source C and said camera A is a mechanism 5 having a superstructure 6 carrying a plurality of film reels 7. Three of said reels are shown herein, but it shall be understood that I am not limited in this respect as the number can be changed to meet given or desired conditions or results to be obtained. This mechanism has vertical spaced apart walls 9—9 with frame openings 8 which respectively register with the lens B and light source C. A guide roller 10 adjacent to one of said walls 9 is positioned with regard to the reels 7 so that positive films leaving the reels may move downward while in close parallel relation to said adjacent wall 9. This mechanism 5 includes a film drawing means 11 whose sprocket wheel 12 is adapted to operate in the usual sprocket holes of the respective films. As shown, this wheel can be moved by a hand crank 13. The sprocket wheel 12 has its teeth formed to accommodate three registered holes in the films when superimposed as illustrated in Figure 5. In this manner, it is seen that the films can be, and in practice are, moved simultaneously across the frame openings 8—8. The camera is provided with the usual mechanism 14 so that a sensitized film can be held drawn across the lens of the camera in operative time with a progressive feed of the aforesaid positive films as the latter function in the mechanism 5.

15, 16 and 17 are identical positive films, and 18 is a positive prepared from a negative bearing the imprints of images in the coinciding frames of said positive films when the latter are superimposed as shown in Figures 1 and 5. It shall be assumed, for the purpose of illustration, that the images contained in the frames of the positive films are of the same object in motion and taken before a background of solid color, preferably white, and while this image is photographed in certain, or what I shall call progressive or successive positions, on each positive film, it is observed that the position which the images occupy on one positive film are in different timed order from the position the images occupy on the other of said positive films. As stated, the positives 15, 16 and 17 are normally the same and may be printed from a common negative. When this is accomplished, I place the positives side by side, flatwise, as shown in Figure 2. I then move the films to step the frames of one film with respect to the frames of the other mating films, while maintaining lateral registration of the picture frames. I then place the positive films one upon another in flat superimposed order and mount them upon the respective reels 7 (Figure 1). When viewed through three laterally registered frames, the images appear multiplied and their positions are successively correlated so that in exposing same to a sensitized film in the camera, each frame of the latter film bears impressions of the objects borne by the laterally registered frames of said positive film. I have said that the image upon each positive film is of the same object. However, this may be changed to suit varying requirements. I have also said that each positive bears a single image. In this respect it should appear obvious that any number of images can be originally placed in each frame so that it may be multiplied as many times as may satisfy a given or desired requirement when two or more of the positives are superimposed, and arranged in printing or impressing relation to a sensitized film as the latter functions in the camera.

After arranging the positive films 15, 16 and 17 in the manner aforesaid, and exposing same to the sensitized film in the camera, I remove the film from the camera and develop and print same to produce a positive, so to speak, as shown in Figure 3.

In Figure 4 the positive film 19 therein shown bears a series of pictures E in the natural order or succession of the object in motion; a series F of objects in an inverse order, and a series G wherein the images occupy the same relative positions in the respective frame of the series. This order of the pictures can continue throughout the entire length of film, and by drawing the film through a projector I am able to show (1) a forward or normal motion of the object, (2) a reverse motion, and (3) a relative inert order of the object. I am thereby able to show these respectively natural and unnatural motions and positions of the object while drawing or moving the film in one direction.

What I claim is:

The herein described method of multiplying and forming upon a sensitized film, images of the same objects in motion contained upon a plurality of positive films, which consists in first photographically printing images of objects upon said positive films and in arranging the films so that the order of the arrangement of the images upon one film is relatively different from the order of arrangement of the same images upon another one of said positives, superimposing the positives to cause their frames to coincide in a manner that will multiply the images when viewed through said frames, and finally moving the positives simultaneously while exposing their coinciding frames to a sensitized film.

ALVIN V. KNECHTEL.